United States Patent
Lerner et al.

(10) Patent No.: US 6,192,395 B1
(45) Date of Patent: Feb. 20, 2001

(54) SYSTEM AND METHOD FOR VISUALLY IDENTIFYING SPEAKING PARTICIPANTS IN A MULTI-PARTICIPANT NETWORKED EVENT

(75) Inventors: Edward A. Lerner, San Francisco, CA (US); Arthur W. Min, Kirkland, WA (US); James E. G. Morris, San Jose, CA (US)

(73) Assignee: Multitude, Inc., South San Francisco, CA (US)

( * ) Notice: Under 35 U.S.C. 154(b), the term of this patent shall be extended for 0 days.

(21) Appl. No.: 09/465,717

(22) Filed: Dec. 17, 1999

Related U.S. Application Data

(60) Provisional application No. 60/113,644, filed on Dec. 23, 1998.

(51) Int. Cl.[7] .................................................. G06F 13/00
(52) U.S. Cl. ........................ 709/204; 709/205; 709/314; 379/202
(58) Field of Search .................................... 709/204, 205, 709/218, 223, 224, 313, 314, 328, 329; 379/202

(56) References Cited

U.S. PATENT DOCUMENTS

| | | |
|---|---|---|
| 4,274,155 | 6/1981 | Funderburk et al. . |
| 4,831,618 | 5/1989 | Bruce . |
| 5,020,098 | 5/1991 | Celli . |
| 5,559,875 | 9/1996 | Bieselin et al. . |
| 5,619,555 | 4/1997 | Fenton et al. . |
| 5,627,978 | * 5/1997 | Altom et al. .......................... 395/330 |
| 5,668,863 | 9/1997 | Bieselin et al. . |
| 5,710,591 | 1/1998 | Bruno et al. . |
| 5,894,306 | 4/1999 | Ichimura . |
| 5,991,385 | 11/1999 | Dunn et al. . |
| 5,999,208 | * 12/1999 | McNerney et al. ..................... 348/15 |

\* cited by examiner

Primary Examiner—Viet D. Vu
(74) Attorney, Agent, or Firm—Pennie & Edmonds LLP

(57) ABSTRACT

A method of visually identifying speaking participants in a multi-participant event such as an audio conference or an on-line game includes the step of receiving packets of digitized sound from a network connection. The identity of the participant associated with each packet is used to route the packet to a channel buffer or an overflow buffer. Each channel buffer may be assigned to a single participant in the multi-participant. A visual identifier module updates the visual identifier associated with participants that have been assigned a channel buffer. In some embodiments, the appearance of the visual identifier associated with the participant is dependent upon the differential of an acoustic parameter derived from content in the associated buffer channel and a reference value stored in a participant record.

25 Claims, 7 Drawing Sheets

SYSTEM AND METHOD FOR VISUALLY IDENTIFYING SPEAKING PARTICIPANTS IN A MULTI-PARTICIPANT NETWORKED EVENT

CROSS-REFERENCE TO RELATED DOCUMENTS

The present invention is related to the subject matter disclosed in U.S. patent application Ser. No. 09/358,877 ("Apparatus and Method for Creating Audio Forums") filed Jul. 22, 1999 and U.S. patent application Ser. No. 09/358,878 ("Apparatus and Method for Establishing An Audio Conference in a Networked Environment") filed Jul. 22, 1999. The present invention is also related to the subject matter disclosed in U.S. Pat. No. 5,764,900 ("System and Method for Communicating Digitally-Encoded Acoustic Information Across a Network between Computers"). These related documents are commonly assigned and hereby incorporated by reference.

This application claims priority to the provisional patent application entitled, "System and Method For Visually Identifying Speaking Participants In a Multi-Participant Networked Event," Ser. No. 60/113,644, filed Dec. 23, 1998.

BRIEF DESCRIPTION OF THE INVENTION

The present invention discloses an apparatus and method for identifying which participants in a multi-participant events are speaking. Exemplary multi-participant events include audio conferences and an on-line games.

BACKGROUND OF THE INVENTION

Historically, multi-participant events such as multi-party conferences have been hosted using Public Switched Telephone Networks (PSTNs) and/or commercial wireless networks. Although such networks allow multiple participants to speak at once, they are unsatisfactory because they provide no means for visually identifying each participant in the event. More recently, teleconferencing systems that rely on Internet Protocol based networks have been introduced. Such systems, which enable two or more persons to speak to each other using the Internet, are often referred to as "Internet telephony."

Multi-participant events include audio conferences and on-line games. Such events typically rely on the conversion of analog speech to digitized speech. The digitized speech is routed to all other participants across a network using the Internet Protocol ("IP") and "voice over IP" or "VOIP" technologies. Accordingly, each participant to the multi-participant event has a client computer. When a participant speaks, the speech is digitized and broken down into packets that may be transferred to other participants using a protocol such as IP, transmission control protocol (TCP), or user datagram protocol (UDP). See, for example, Peterson & Davie, *Computer Networks,* 1996, Morgan Kaufmann Publishers, Inc., San Francisco, Calif.

While prior art Internet telephony is adequate for limited purposes, such as a basic two-party conference call in which only one participant speaks at any given time, prior art telephony systems are unsatisfactory. First, they frequently do not permit multiple participants to speak at the same time without data loss. That is, if one participant speaks, the participant typically cannot hear what other people said while the participant was speaking. Second, prior art telephony does not adequately associate a visual identifier with each participant. Therefore, when a multi-participant event includes several participants, they have difficulty determining who is speaking. Some Internet telephony systems have attempted to remedy this deficiency by requiring (i) that only one speaker talk at any given time and/or by (ii) posting, on each client associated with a participant in the multi-participant event, the icon of the current speaker. However, such solutions to the problem in the art are unsatisfactory because effective multi-participant communication requires that their be an ability for multiple people to simultaneously speak. Therefore, the concept of waiting in line for the chance to speak is not a satisfactory solution to the problem in the art.

A third drawback with prior art systems is that they provide no mechanism for associating the characteristics of a participant with a visual identifier that is displayed on the client associated with each participant in the multi-participant event. Such characteristics could be, for example, a visual representation of how loudly a particular speaker is speaking relative to some historical base state associated with the participant. A fourth drawback of prior art Internet telephony systems is that they provide an unsatisfactory privilege hierarchy for dictating who may participate in a particular multi-participant event. For example, in typical prior art systems, there is no privilege hierarchy and any user, i.e. the public, may join the multi-participant event. Such multi-participant events can be designated as "public forums." While public forums serve a limited purpose, they suffer from the drawback that there is no protection against hecklers or otherwise disruptive participants in the event. To summarize this point, prior art systems are unsatisfactory because they do not provide a set of hierarchical privileges that are associated with a participant and that allow participants to designate events as private, public, or moderated. As used in this context, private events include conference calls in which the participants are preselected, typically by each other. Other users of a system may not join the event unless invited by one of the existing participants. Public events are those in which anyone can join and speak at any time. Moderated events may be public or private, but require that at least one participant be given enhanced privileges, such as the privilege to exclude particular participants, invite participants or grant and deny speaking privileges to participants.

What is needed in the art is an Internet telephony system and method that provides the tools necessary to conduct an effective multi-participant event. Such a system should not have limitations on the number of participants that may concurrently speak. Further, such a system should provide an adequate way of identifying the participants in the multi-participant event.

SUMMARY OF THE INVENTION

The system and method of the present invention addresses the need in the art by providing an Internet telephony system and method that visually identifies the participants in a multi-participant event. In the present invention, there is no limitation on the number of participants that may concurrently speak. Each participant in a multi-participant event is associated with a visual identifier. The visual identifier of each participant is displayed on the client display screen of the respective participants in the multi-participant event. In one embodiment, at least one characteristic of the participant is reflected in the visual identifier associated with the participant. Further, the system and method of the present invention addresses the unmet need in the art by providing participants with the flexibility to assign a privilege hierarchy. Using this privilege hierarchy, events may be designated as public, private, or moderated and selected participants may be granted moderation privileges.

A system in accordance with one aspect of the present invention includes a participant data structure comprising a plurality of participant records. Each participant record is associated with a different participant in a multi-participant event. Multi-participant events of the present invention include audio conferences and on-line games. Further, systems in accordance with one aspect of the present invention include an application module, which provides a user interface to the multi-participant event, and a sound control module that is capable of receiving packets from a network connection. Each packet is associated with a participant in the multi-participant event and includes digitized speech from the participant. The sound controller has a set of buffers. Each buffer preferably manages packets as a first-in first-out queue. The sound controller further includes a packet controller that determines which participant is associated with each packet that has been received by the network connection. The sound controller routes the packet to a buffer based on the identity of the participant associated with the packet. The sound controller also includes a visual identification module for determining which participants in the multi-participant event are speaking. The visual identification module updates the visual identifier associated with each participant that is speaking to reflect the fact that they are speaking. Further the visual identification module updates the visual identifier associated with each participant that is not speaking to reflect the fact that they are not speaking. Finally, systems in accordance with a preferred embodiment of the present invention include a sound mixer for mixing digitized speech from at least one of the buffers to produce a mixed signal that is presented to an output device.

In some embodiments of the present invention, the participant record associated with each participant includes a reference speech amplitude. In such embodiments, the visual identification module determines a buffered speech amplitude based upon a characteristic of digitized speech in at least one packet, associated with said participant, that is managed by a buffer and computes a speech amplitude differential based on (i) the buffered speech amplitude and (ii) the reference speech amplitude stored in the participant record. The visual identifier associated with the participant is updated based on this speech amplitude differential. Further, the buffered speech amplitude is saved as a new reference speech amplitude in the participant record associated with the participant.

In a method in accordance with the present invention packets are received from a remote source and an identity associated with each packet is determined. In one embodiment, this identity does not disclose the true identity of the participant. In such embodiments, the identity could be a random number assigned to the participant for the duration of the multi-participant event. The identity of each packet received from the remote source is compared with an identity associated with a channel buffer. The identity associated with each channel buffer is determined by an identity of a packet stored by the channel buffer. In one embodiment, a channel buffer is reserved for a single participant in the multi-participant event at any given time. When the channel buffer is not storing a packet the channel buffer is not associated with a participant and is considered "available." Packets are routed based on the following rules:

(i) to a channel buffer when the identity of the packet matches the identity associated with a channel buffer;
(ii) to an available channel buffer when the identity of the packet does not match an identity of a channel buffer; and
(iii) to an overflow buffer when the identity of the packet does not match an identity of a channel buffer and there is no available channel buffer.

A different visual identifier is associated with each participant in the multi-participant event. In some embodiments of the present invention, the appearance of the visual identifier is determined by whether the identity of the participant associated with the visual identifier matches an identity associated with a channel buffer. In other embodiments of the present invention, the appearance of the visual identifier is determined by the difference between an acoustic parameter derived from digitized speech in a channel buffer associated with the participant and a reference acoustic parameter stored in a participant record.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
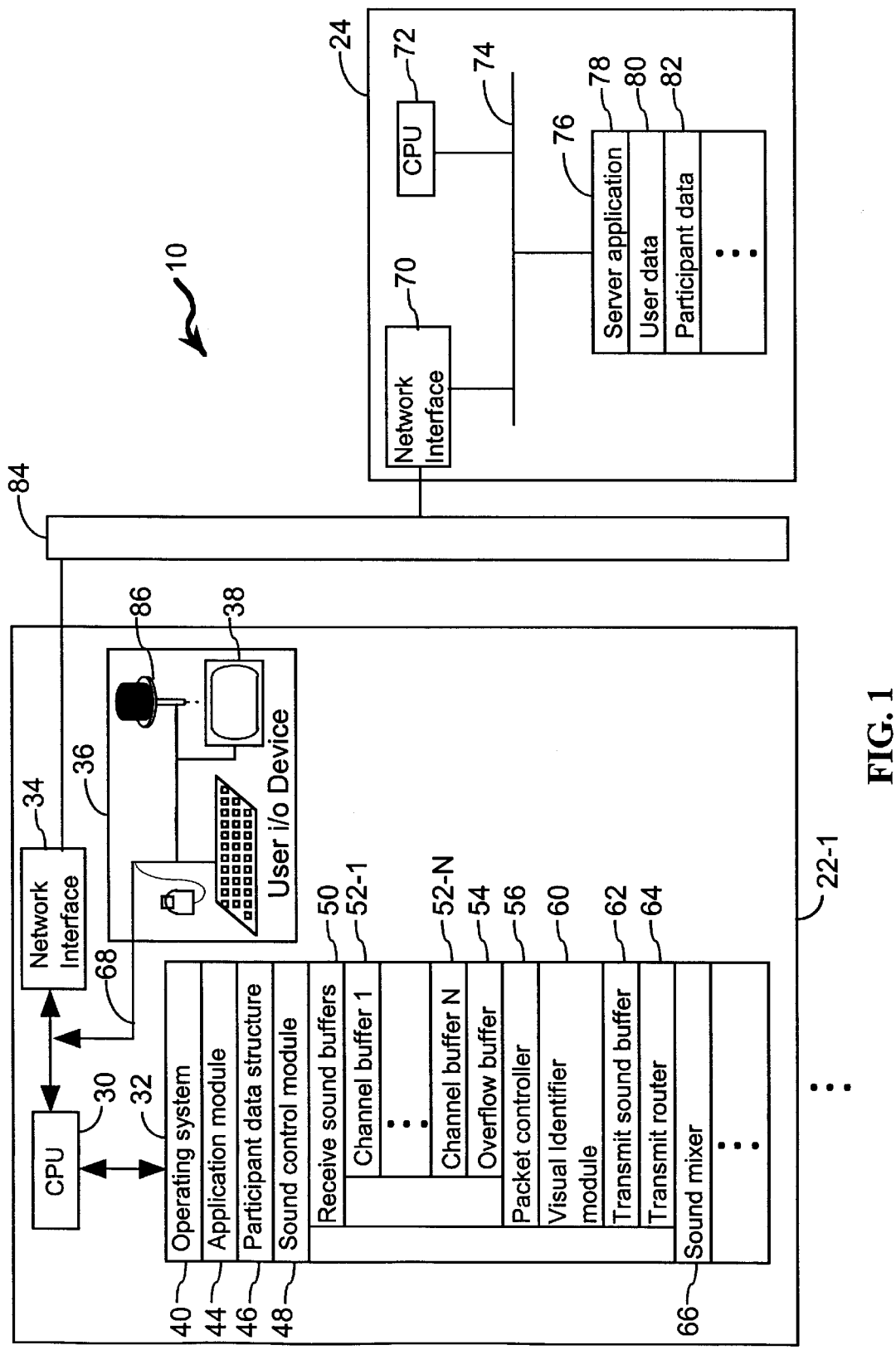
FIG. 1 illustrates a system for identifying which participants in a multi-participant event are speaking in accordance with one embodiment of the invention.

FIG. 1 illustrates a client/server computer apparatus 10 incorporating the technology of the present invention. The apparatus 10 includes a set of client computers 22 which are each linked to a transmission channel 84. The transmission channel 84 generically refers to any wire or wireless link between computers. The client computers 22 use transmission channel 84 to communicate with each other in a multi-participant event. The multi-participant event could be regulated by a server computer 24 or other server computers designated by server computer 24.

Each client computer 22 has a standard computer configuration including a central processing unit (CPU) 30, network interface 34, and memory 32. Memory 32 stores a set of executable programs. Client computer 22 also includes input/output device 36. Input/output device 36 may include a microphone, a keyboard, a mouse, a display 38, and/or one or more speakers. In one embodiment, the microphone is PC 99 compliant with a close speaking headset design having a full scale output voltage of 100 mV.

Further, in one embodiment, the microphone has a frequency response of ±5 db from 100 Hz to 10 kHz, ±3 dB from 300 Hz to 5 kHz and 0 db at 1 kHz. The microphone has been implemented with a minimum sensitivity of −44 dB relative to 1 V/Pa. CPU 30, memory 32, network interface 34 and input/output device 36 are connected by bus 68. The executable programs in memory 32 include operating system 40, an application module 44 for providing a user interface to the multi-participant event, a participant data structure 46 for storing information about each participant in a multi-participant event, and a sound control module 48. Sound control module 48 receives sound from remote participants through network interface 34 and transmits sound from the local participant, which is associated with client 22, to remote participants across transmission channel 84. Memory 34 also includes sound mixer 66 for combining the sound of each participant in the multi-participant event into a single signal that is sent to input/output device 36. In a preferred embodiment, operating system 40 is capable of supporting multiple concurrent processes or threads and includes sound mixer 66. In an even more preferred embodiment, operating system 40 is a WIN32 environment or an environment that provides functionality equivalent to WIN32.

FIG. 1 illustrates that each client 22 is associated with a local participant in the multi-participant event. The local participant uses input/output device 36 to communicate to remote participants in the multi-participant event via transmission channel 84. Sound control module 48 has instructions for routing sound from the local participant to the remote participants and for receiving sound from remote participants. To receive sound from remote participants, sound control module 48 includes a plurality of receive sound buffers 50. In a preferred embodiment, one of the receive sound buffers is an overflow buffer 54 and each of the remaining receive sound buffers is a channel buffer 52. In a preferred embodiment, receive sound buffers 50 comprises four channel buffers 52 and one overflow buffer 54. Sound control module 48 further includes a packet controller 56 for determining the participant associated with a packet of sound received from a remote participant and for routing the packet to the appropriate receive sound buffer 50. In addition, sound control module 48 includes a visual identifier module 60 that determines which participants in a multi-participant event are speaking.

Sound from the local participant is stored in a transmit sound buffer 62 and routed to the appropriate destination by transmit router 64. Transmit router 64 breaks the signal in transmit sound buffer 62 into packets and places the appropriate header in each packet. Typically, the header includes routing information that will cause the packet to be sent to server 24 via transmission channel 84. Server 24 will then route the packet to all participants in the multi-participant event. However, in some embodiments, transmit router 64 may direct the packets to other clients 22 directly instead of through server 24.

Server 24 in system 10 includes a network interface 70 for receiving sound from clients 22 and for directing the sound to each client 22 that is participating in a multi-participant event. Server 24 further includes CPU 72 and memory 76. Network interface 70, CPU 72 and memory 76 are connected by bus 74. In a typical server 24, memory 76 includes one or more server applications 78 for tracking multi-participant events hosted by the server. Memory 76 further includes the profile of each user that has the privilege of using server 24 to participate in multi-participant events. These profiles are stored as user data 80. An identity of each participant in a multi-participant event hosted by server 24 is stored in memory 76 as participant data 82.

The general architecture and processing associated with the invention has now been disclosed. Attention presently turns to a more detailed consideration of the architecture of the invention, the processing of the invention, the distinctions between these elements and corresponding elements in the prior art, and advantages associated with the disclosed technology.

Figure 2:
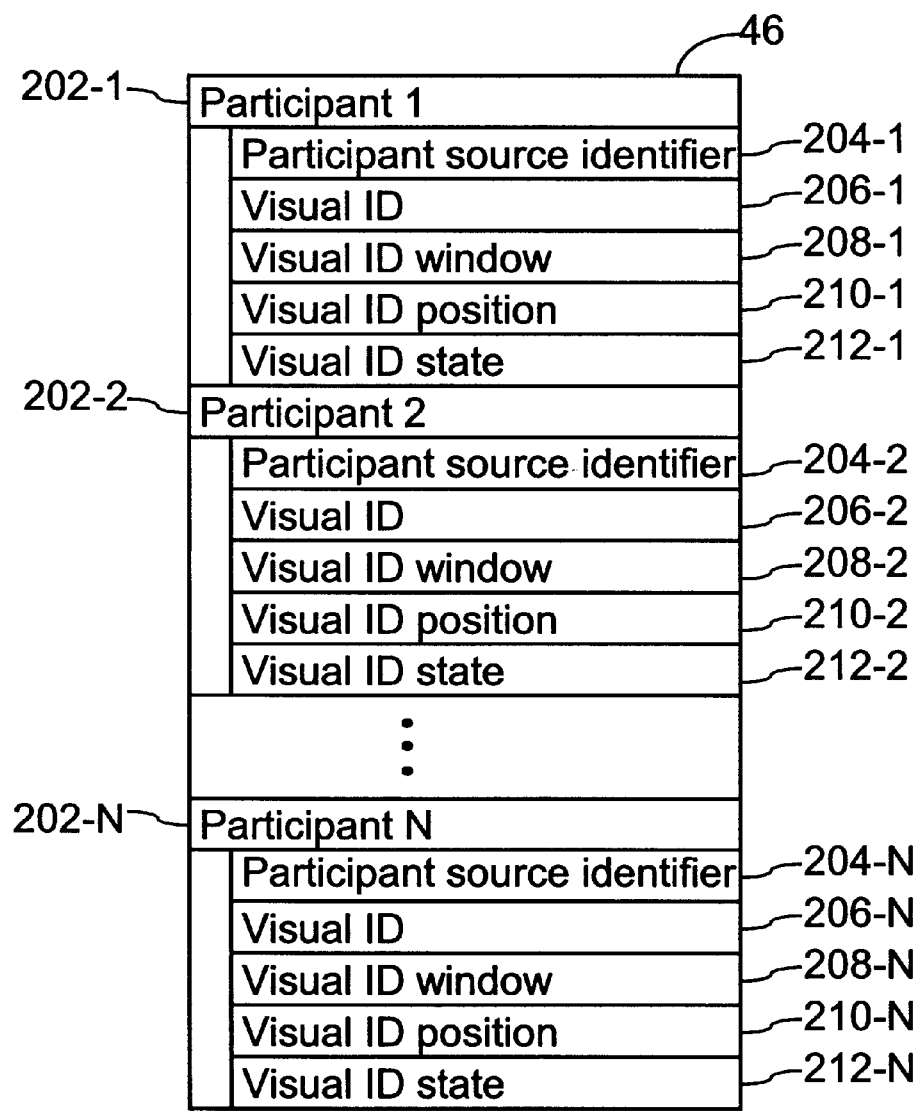
FIG. 2 illustrates a participant data structure in accordance with one embodiment of the invention.

FIG. 2 provides a detailed view of participant data structure 46 that is used in one embodiment of the present invention. Data structure 46 includes a record 202 for each participant in an multi-participant event. Each record 202 includes a participant source identifier 204. In one embodiment of the present invention, participant source identifier 204 does not provide information that identifies the actual (true) identity of a participant in the multi-participant event. In such embodiments, participant source identifier 204 does not include the IP address or name of the remote participant. For example, server application 78 (FIG. 1) may assign each participant a random number when the participant joins a multi-participant event. This random number is transiently assigned for the duration of the multi-participant event and cannot be traced to the participant. In other embodiments, participant source identifier 204 is the true identity of the participant or is a screen name of the participant. In such embodiments visual ID 206 (FIG. 3) identifies the associated participant. Thus, each participant is aware of exactly who is included in the multi-participant event.

In one embodiment, visual ID 206 is an icon that represents the participant. Visual ID 206 may be randomly chosen from a library of icons by sound control module 48 when a participant joins the multi-participant event. Automatic assignment of a visual ID 206 to each participant has the advantage of preserving participant anonymity. Alternatively, visual ID 206 is selected by the participant or uniquely identifies the participant by, for example, including the participant's actual name, screen name, and/or a picture of the participant.

In complex applications, a local participant may engage in several concurrent multi-participant events using client 22. Each multi-participant event will be assigned a window by application module 44 (FIG. 1). In such embodiments, it is necessary to provide a visual ID window field 208 in record 202 to indicate which window visual ID 208 is located in and/or which multi-participant event visual ID 206 is associated with. Each record 202 further includes the position that visual ID 204 occupies in visual ID window 208. In embodiments that do not support concurrent multi-participant events on a single client 22, visual ID window field 208 is not required. In such embodiments, visual ID position 210 represents the position of visual ID in the window assigned to application module 44 by operation system 40 (FIG. 1).

One advantage of the present system over the prior art is the use of visual ID state 212, which represents a state of participant 204. In some embodiments, visual ID state 212 is a single bit. When participant 204 is speaking the bit is set and when participant 204 is not speaking the bit is not set. In other embodiments, visual ID state 212 is selected from a spectrum of values. The low end of this spectrum indicates that participant 204 is not speaking and the high end of the spectrum indicates that participant 204 is speaking much louder then normal. Regardless of how visual ID state 212 is configured, it is used to modify the appearance of visual ID 206 on input/output device 36. For example, in embodiments where visual ID state 212 is a value selected from a spectrum, the value stored by visual ID state 212 may be used to determine visual ID 206 brightness. As an illustration, when visual ID 206 is a two-dimensional array of pixel values, each pixel value in the array may be adjusted by a constant determined by the value of visual state 212. Thus, visual ID states 212 at the high end of the spectrum alter the average pixel value in the array by a larger constant than visual ID states 212 in the low end of the spectrum. In an alternative embodiment, visual ID state 212 is used to shift the color of each pixel in visual ID 206. As an illustration, when visual ID state 212 is at the high end of the spectrum, visual ID 206 is red-shifted and when visual ID state 212 is at the low end of the spectrum, visual ID 206 is green-shifted. In yet another embodiment, the particular visual ID 206 is selected from a library of visual IDs to represent participant 202 based on a function of the value of visual ID state 212. For instance, a particularly animated visual ID 206 may be selected to represent participant 202 when the participant is speaking loudly.

In yet another embodiment, visual state 212 includes information about the participant, such as whether the participant is speaking, has certain privileges, has placed the event on hold, or is away from the keyboard. In one embodiment, visual state 212 specifies whether the participant has moderation privileges, such as the privilege to invite potential participants to the multi-participant event, the privilege to remove people from the multi-participant event, or the privilege to grant and deny speaking privileges to other participants in the multi-participant event. In some embodiments, a participant may place an event on hold in the classic sense that the event is muted on client 22 and sound is not communicated from or to the client 22 associated with the participant. Visual state 212 may be used to reflect the fact that the participant is on hold. In some embodiments, the participant may also have the option to designate that he is "away from the keyboard." This state is used to inform other participants that the participant is not within earshot of the multi-participant event but will be back momentarily. It will be appreciated that any information included in visual state 212 may be used to update the appearance of the visual ID 206 associated with the participant.

Figure 3:
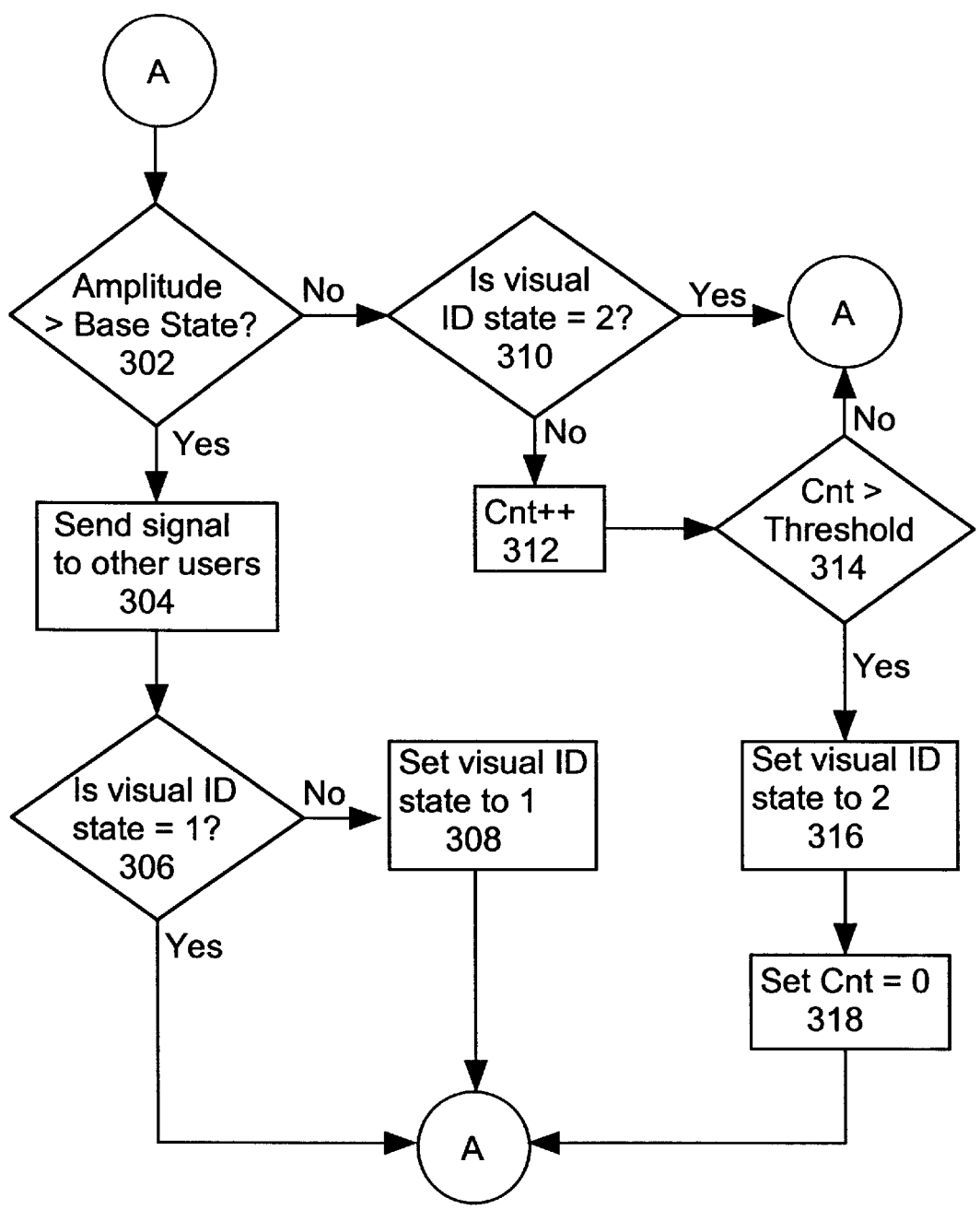
FIG. 3 illustrates a flow diagram of the processing steps associated with updating the visual identifier associated with a participant on a client computer in accordance with one embodiment of the invention.

Referring to FIG. 3, detailed steps that describe how sound from a local participant is processed by sound control module 48 is shown. In step 302, sound control module 48 monitors a microphone 86 (FIG. 1) for sound. In the embodiment depicted in FIG. 3, when the amplitude of sound detected by microphone 36 exceeds a base state (302-Yes), processing step 304 is triggered. In processing step 304, the signal is stored in transmit sound buffer 62, packaged into a packet and routed to remote participants of the multi-participant event by transmit router 64 (FIG. 1). In one embodiment, transmit router 64 will forward the packet to server 24 and server 24 will route the packet to remote participants based on participant data 82 information stored in memory 76 (FIG. 1). Such an embodiment is capable of preserving the anonymity of each participant in the multi-participant event. In an alternative embodiment, the identity of the participant is included in the packet and participant anonymity is precluded. In processing step 306, the visual ID 206 (FIG. 2) of the local participant is updated. If the visual ID 206 (FIG. 2) corresponding the local participant is not in state 1 (306-No), processing step 308 is executed to set visual ID 206 to state "1". Processing steps 306 and 308 represent an embodiment in which visual ID is set to "1" when the local participant is speaking and "2" when the local participant is not speaking. One of skill in the art will appreciate that visual ID state 212 could be assigned any number in a spectrum and this number could be used to adjust the appearance of visual ID 206. Further, it will be appreciated that processing steps 306 and 308 or their equivalents could be executed prior to processing step 304 and that the updated value of visual ID state 212 could be packaged into the sound packet that is transmitted in processing step 304. Other clients 22 could then use the value of visual ID state 212 to update the appearance of the associated visual ID 206. Once processing steps 304 thru 308 have been executed, the process repeats itself by returning to processing step 302.

Processing step 302 is a continuous input function. Microphone 36 constantly detects sound and system 10 is capable of storing sound from transmit sound buffer 62 during the execution of processing steps 304 thru 318. In a WIN32 environment, step 302 may be implemented using Microsoft Windows DirectSoundCapture. Techniques well known in the art may be used to control the capture of sound from microphone 36 so that the speech from the local participant is stored in transmit sound buffer 62 and periods of silence or lengthy pauses in the speech of the local participant are not stored in the buffer. In one embodiment, "frames" of sound from microphone 36 are acoustically analyzed. Preferably each frame of sound has a length of 500 milliseconds or less. More preferably each frame of sound has a length of 250 milliseconds or less and more preferably 100 milliseconds or less. In an even more preferred embodiment, each frame has a length of about ten milliseconds. Typically, the acoustic analysis comprises deriving parameters such as energy, zero-crossing rates, auto-correlation coefficients, linear predictive coefficients, PARCOR coefficients, LPC cepstrum, mel-cepstrum, Karhunen-Loeve transform (KLT) parameters, maximum likelihood ratio (MLR) criteria and/or spectra from each frame and using these parameters to determine whether the input frame is speech or noise. In some embodiments, speech patterns of the local participant may be stored by client 22 and matched with the input frames in order to predict whether any given frame is noise (302-No) or speech (302-Yes). In alternative embodiments, only the energy value of a particular frame is used to determine whether the frame is speech or noise. In such embodiments, the calculated energy level of a frame is compared to a threshold energy value. When the energy value of the frame exceeds the base state (302-Yes) the frame is stored in transmit sound buffer 62. In some embodiments, the value used for the base state (threshold value) is updated continuously based on parameters derived from an acoustic analysis of the content of transmit sound buffer 62.

It will further be appreciated that noise suppression techniques may be implemented to improve step 302 and to suppress background noise from speech stored in transmit sound buffer 62. For example, input device 36 may be a noise canceling microphone. Additionally, input device 36 may comprise two microphones. The two microphones may be used as a phased array to give enhanced response in the direction of the local participant. Alternatively, one microphone (the "speech microphone") collects the speech of the local participant plus background noise and the other microphone (the "reference microphone") is positioned so that it collects only background noise. Although the noise waveform of the speech and reference microphones may be different, filters such as a finite-impulse-response ("FIR") filter can be used to match the noise waveform at the speech microphone and the noise waveform at the reference microphone. Once a match is found in the two noise waveforms, input from the speech microphone may be filtered.

When it is determined that the local participant has stopped speaking for a period of time (302-No), processing step 310 is executed to check the status of the visual ID 206 associated with the local participant. When visual ID 206 is not in state 2, a counter is incremented (step 312). If the counter exceeds a threshold count after processing step 312 (314-Yes), visual ID 206 is set to state 2 (316) and the counter is reset to zero (318). Then the process repeats.

Figure 4:
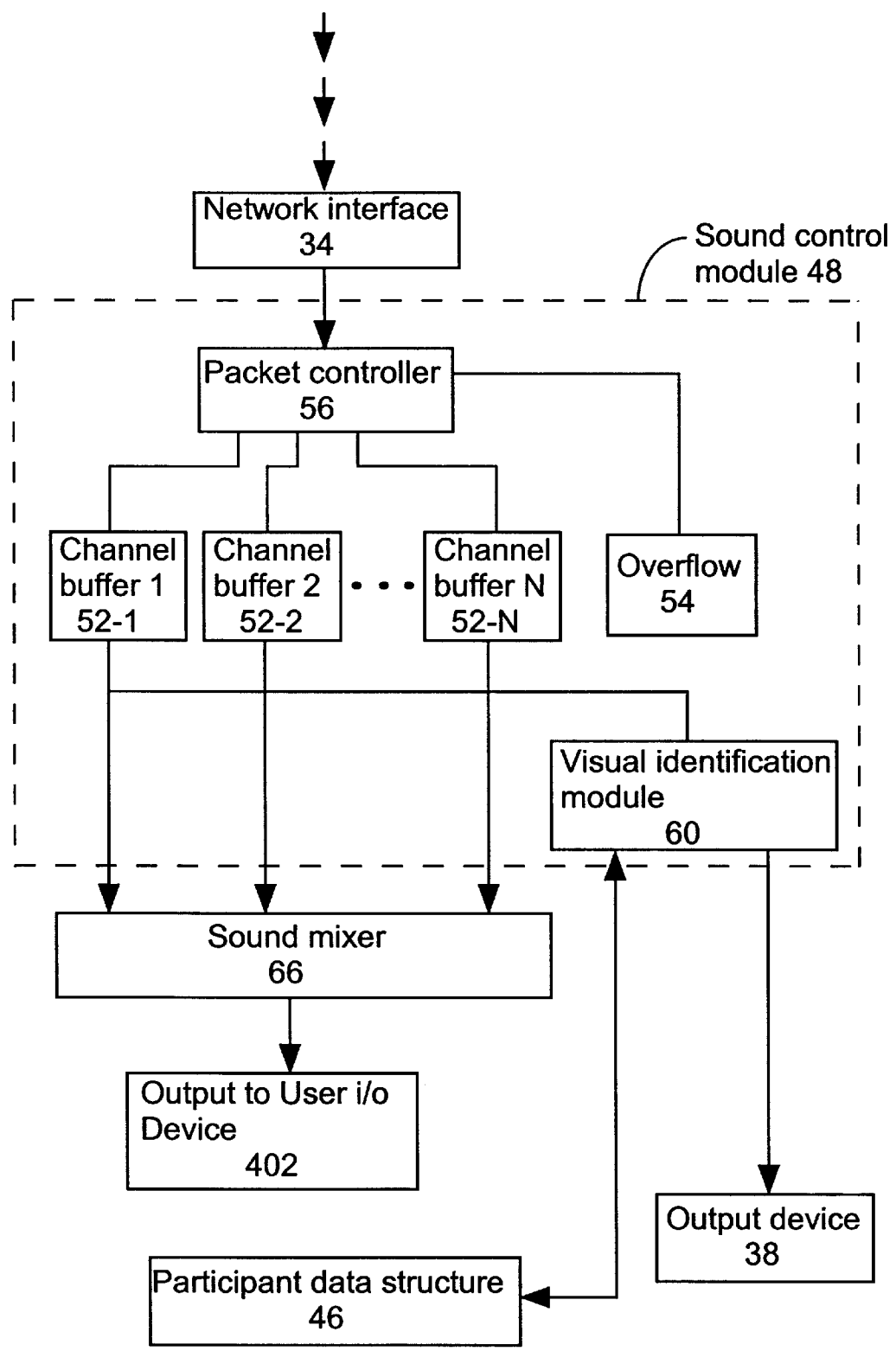
FIG. 4 is a more detailed view of how a sound control module interfaces with other components of memory in a client computer in accordance with one embodiment of the invention.

FIG. 4 provides a detailed illustration of how sound control module 48 handles sound from multiple remote participants. As shown in FIG. 4, packets that contain sound from remote participants are received by network interface 34 from transmission channel 84. The packets are then routed by packet controller 56. Packet controller 56 examines each packet and determines the source (identity) of the packet. In one embodiment, each participant in the multi-participant event is assigned a random number by server 24 for the duration of the multi-participant event. This random number is included in each packet transmitted by the participant and serves as the basis for the determination of packet identity by packet controller 56. As an illustration, consider an event that includes a first remote participant and a second remote participant. When the first remote participant joins the event, server application 78 assigns the participant the number "12". When the second remote participant joins the event, server application 78 assigns the participant the number "81". Thereafter, for the duration of the event, each packet originating from the first participant will include the number "12" and each packet from the second participant will include the number "78". When packets from the first and second remote participants are routed to client 22, packet controller 56 will identify and route the packets based on the presence of the numbers "12" or "81" present in each packet.

Figure 5:
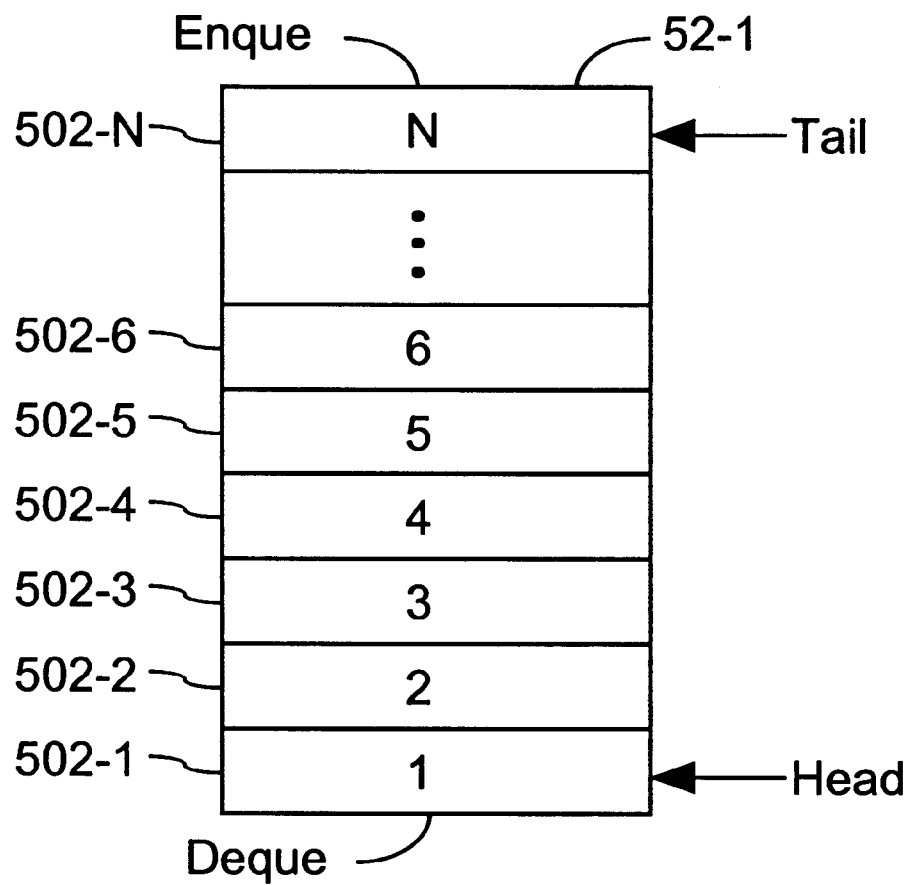
FIG. 5 illustrates the structure of a channel buffer in one embodiment of the invention.

As shown in FIG. 4, in one embodiment of the present invention, sound control module 48 includes four channel buffers 52 and an overflow buffer 54. Preferably, each channel buffer is capable of storing any number of packets from a particular participant in the multi-participant event. An appreciation of how packet controller 56 routes packets to a channel buffers 52 or overflow buffer 54 is better understood after a preferred embodiment of channel buffer 52 has been described. FIG. 5 describes such an embodiment. In FIG. 5, channel buffer 52 is a queue. Queues provide a structure that allows for the addition of packets at one end and the removal of packets at the other end. In this manner, the first packet placed in the queue is the first to be removed, thus approximating the common activity of waiting in line. Such a procedure is known to those of skill in the art as first in first out ("FIFO"). Packets 502 are placed onto a channel buffer 52 by enqueing the packet onto channel buffer 52. The most recently enqueued packet is known as the tail of channel buffer 52. Packets are removed from channel buffer 52 by the process of dequeuing. The packet that is the next to be dequeued is known as the head of the buffer.

In one embodiment, channel buffer 52 is a linked list. However, one of skill in the art will appreciate that a number of different alternative methods may be used to implement a channel buffer. For example, in some embodiments, channel buffers 52 may be supported directly by operating system 40. In other embodiments, channel buffers 52 may be implemented directly in client 22 hardware. In preferred embodiments, there is no limitation in the number of packets each channel buffer 52 is capable of storing. However, at any given instance, each channel buffer 52 is reserved by packet controller 56 in order to process packets from a particular participant 202 (FIG. 2) in the multi-party event. Therefore, although there is no limitation imposed by packet controller 56 on the size of a particular channel buffer 52, each channel buffer 52 will only contain packets from a single participant 202 (FIG. 2) in the multi-participant event at any given instance.

In contrast to channel buffers 52, overflow buffer 54 may store packets from several different participants. The packets from each participant in the multi-participant event represented in overflow buffer 54 will be processed by packet controller in a FIFO manner as described in more detail below. Importantly, the packets originating from each participant represented in overflow buffer 54 will be handled in a FIFO manner irrespective of the presence of packets from other participants that may be present in overflow buffer 54. As an illustration, if packets associated with participants A and B are both present in overflow buffer 54, the packets associated with participant A will be processed as a first FIFO and the packets from participant B will be processed as a second FIFO. Further, the first and second FIFOs will not be dependent on each other.

Now that the structure of illustrative channel buffers 52 and overflow buffer 54 have been described in more detail, attention returns to FIG. 4. In a first independent process, packet controller 56 determines whether overflow buffer 54 is empty. If overflow buffer 54 is not empty and there is an available channel buffer 52, the packet at the head of overflow buffer 54 ("overflow head packet") will be routed to the tail of the first available channel buffer 52. Further, any packets that are associated with the same participant that overflow head packet is associated with will also be routed in a FIFO manner from overflow buffer 54 to the same available channel buffer 52 that the overflow head packet was routed. For example, if the overflow head packet was associated with participant A, then any remaining packets in overflow buffer 54 that are associated with participant A will be routed to the same available channel buffer 52 that the overflow head packet was routed. Further, the order by which such packets are routed to the available channel buffer from overflow buffer 54 will be based upon the order by which the packet was enqueued onto the overflow buffer (i.e., FIFO).

In a second independent process, packet controller 56 collects packets from network interface 34. For each packet received from network interface 34, packet controller 56 determines the identity of the participant that is associated with the packet. In embodiments in which the true identity of the participants in the multi-participant event are not disclosed, the distinguishing information that the packet controller obtains from each packet is typically the random number that was assigned by server application 76 to the participant when the participant joined the multi-participant event (FIG. 1). Once the identity of a packet is determined, packet controller 56 routes the packet using the following two rules:

Rule 1 Packet controller 56 compares the identity of the packet received from network interface 34 to the identity of the packet at the tail of each channel buffer 52. If there is a match, packet controller 56 routes the packet to this matching channel buffer regardless of the number of packets that are already on the buffer. When packet controller 56 routes the packet to the matching channel buffer 52, the packet is enqueued onto the buffer 52 and the routed packet therefore becomes the tail of the buffer. At a programming level enqueuing may involve the addition of the routed packet to a linked list that represents channel buffer 52. It will be appreciated that in a preferred embodiment packet controller 56 keeps track of the identity of the participant that is assigned to each of the channel buffers and that there is no need to actually query the tail of channel buffer 52. Preferably, there are four channel buffers in sound control module 48 and packet controller 56 tracks which participant is assigned to each of the four buffers.

Rule 2. When packet controller 56 cannot find a match between the identity of the received packet and the identity associated with the packet at the tail of each channel buffer 52, the packet is routed to overflow buffer 54. For example, if there are five participants speaking simultaneously in a multi-participant event and there are four channel buffers 52 in sound control module 48, packets originating from the fifth participant will be routed into the overflow buffer 54 until a channel buffer 52 becomes available. It will be appreciated that, in this example, it is possible that some packets from the fifth participant will be routed to overflow buffer 54 even though the packets from the fifth participant were received by packet controller 56 before some of the packets from the first four participants were received. This situation arises because, when packet controller 56 routes a packet to a channel buffer 52, the packet controller reserves the channel buffer 52 for packets that have the same identity as the routed packet until the channel buffer 52 is emptied.

The details of the two independent processes that are executed by sound control module 48 have now been disclosed. The first process describes the method by which overflow buffer 54 is dequeued. The second process describes the rules used by packet controller 56 to route packets received from network interface 54. In one embodiment these two processes are run as two independent threads. In embodiments where multiple independent threads or processes are used to execute the functions of sound control module 48, channel buffers 52 and overflow buffer 54 are placed in a virtual memory that is visible to all of the threads or processes. There are several techniques known to those of skill in the art for providing virtual memory that is visible to multiple processes at once. For example, the memory can be shared directly. When operating system 40 is a Microsoft Windows operating system, WIN32 application programming interface ("API") functions can be used to define virtual memory that is accessible to multiple independent threads. WIN32 functions for managing virtual memory and the storage that backs it ("memory mapped files") such as CreateFileMapping and MapViewOfFile may be used to make channel buffers 52 and overflow buffer 54 visible to multiple independent threads.

When sound control module 48 is implemented in a WIN32 embodiment, it will be appreciated that WIN32 system calls can be used to implement sound control module 48. Separate threads can enqueue and dequeue channel buffers 52 and overflow buffer 54. The channel buffers 52 and overflow buffer 54 can be executed as one-way data channels such as unnamed anonymous pipes or named pipes. Pipes provide a suitable device for passing data between threads. Using a pipe, packets may pass through the pipe in a first-in, first-out manner, like a queue. All thread synchronization between the input and output ends of the pipe may be handled automatically by operating system 40. In the WIN32 environment, a pipe may be created using CreatePipe. Processes having the appropriate privileges may put packets on the pipe (enqueue the pipe) using the WriteFile system call and remove packets from the pipe (dequeue the pipe) using ReadFile. In still other preferred embodiments, channel buffers 52 and overflow buffer 54 may be implemented using Microsoft DirectSound and more specifically IdirectSoundBuffer and/or IDirectSound3DBuffer. In such embodiments, a buffer could be defined by the Direct X API CreateSoundBuffer.

Referring to FIG. 4, visual identification module 60 determines which participants in a multi-participant event are speaking and updates the visual ID state 212 of participant data structure 46 (FIGS. 1 & 2). In one embodiment, visual identification module 60 is a component of packet controller 56. When packet controller 56 reserves a channel 52 for a participant (FIG. 4), visual ID state 212 of the participant 202 (FIG. 2) is updated. In another embodiment, visual identification module 60 is an independent thread or process that periodically queries packet controller 56 to determine which participants are speaking using standard interprocess communication (IPC) protocols. In one embodiment, visual identification module 60 queries packet controller 56 every one hundred milliseconds and updates participant data structure 46 and/or output device 38.

Sound mixer 66 dequeues the head packet of each channel buffer 52 in sound control module 48 and mixes the signal using techniques well known in the art. For example, when a suitable WIN32 environment that includes suitable DirectSound components or their equivalents are present in operating system 40, sound mixer 66 may be supported directly at the operating system level. The digitized sound produced by sound mixer 60 is converted to analog signals using a digital-to-analog converter and presented to various input/output devices 402 (36 FIG. 1) such as a headphone jack and/or one or more speakers.

Now that a detailed description sound control module 48 has been described, a number of advantages of the present system will be apparent to those of skill in the art. A participant in a multi-participant event can easily keep track of who is talking even in cases where multiple participants are talking. Further, it is possible to visually track the emotional state of each participant by providing graduated visual icon IDs 206 based upon visual ID state 212. An additional advantage of the present invention is that in some embodiments each participant is represented on the display 38 of client 22 (FIG. 1) without revealing the true identity, such as the name or source IP address, of the participant. Further, the determination of whether each participant in the multi-participant event is speaking may be made even at times when the local participant is speaking because no information is lost while the local participant is speaking.

Figure 6:
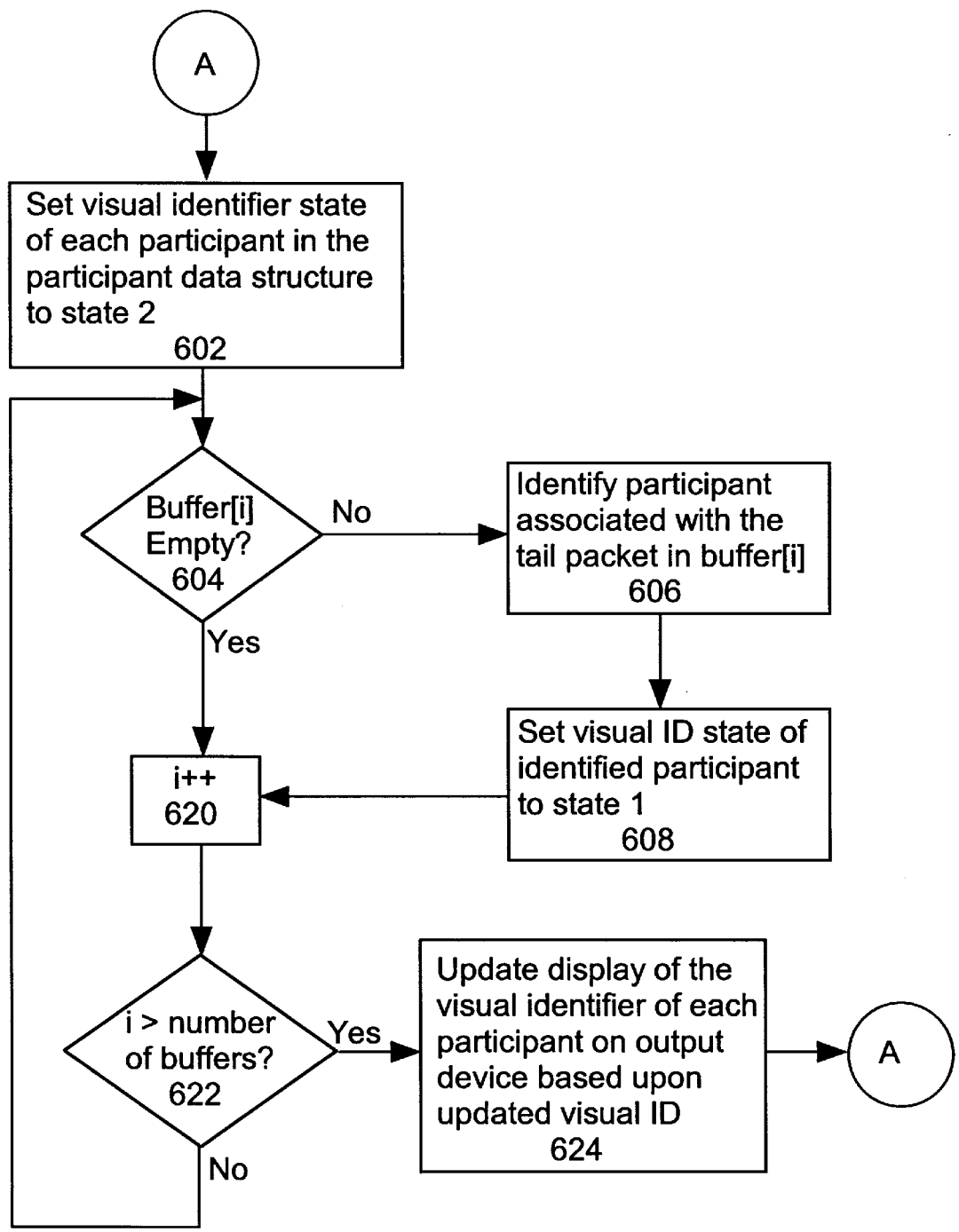
FIG. 6 illustrates the processing steps associated with identifying which participants in a multi-participant event are speaking in accordance with one embodiment of the present invention.

Referring to FIG. 6, detailed processing steps are shown for how visual identification module 60 may update the visual ID 206 (FIG. 2) of each participant in a multi-participant event. In processing step 602, the visual ID state 212 of each participant in data structure 46 (FIG. 2) is set to state "2" indicating that the associated participant is not speaking. Then, packet controller 56 is queried to determine whether a channel buffer 52 is empty. In the embodiment illustrated in FIG. 6, channel buffers 52 are queried in a sequential order from 1 to N where N represents the number of channel buffers 52 in sound control module 48. However, in practice, no linear sampling of sequential channel buffers 52 is necessary as long as each channel buffer 52 is sampled on a periodic basis. When channel buffer i is empty (604-Yes), i is advanced by one 620. If i is less than N (622-No), the process returns to processing step 604. When channel buffer i is not empty (604-No), packet controller is queried for the identity of the participant that packet controller 56 has reserved for channel buffer i (Step 606). Then, the visual ID 206 of the participant identified in step 606 is set to "1" (608). When i has surpassed the number of channel buffers 52 present in sound control module 48 (622-Yes), the visual ID 206 of each participant listed in participant data structure 46 is updated on display 38 based upon the updated visual ID state 212 values (624).

Figure 7A:
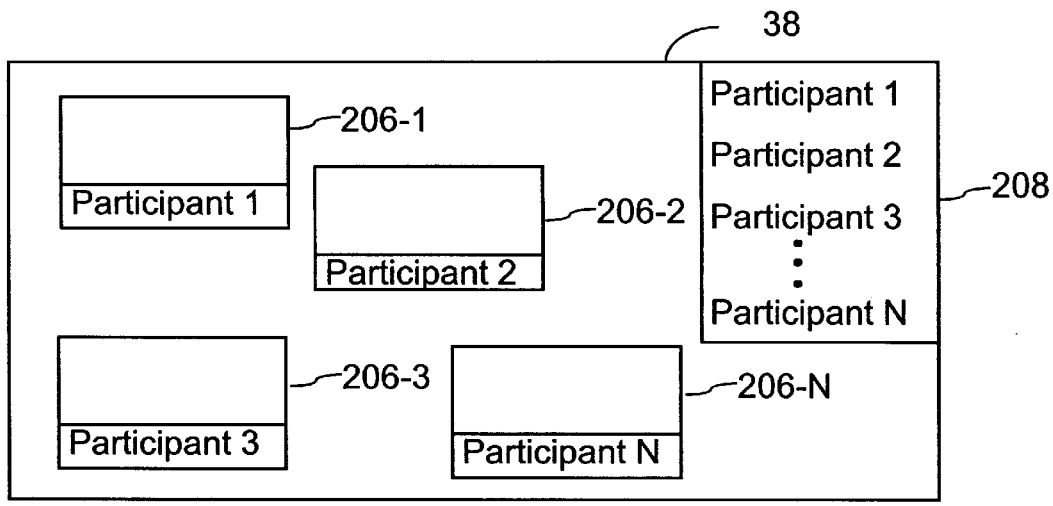
FIGS. 7a–7c are a stylized illustration of the visual identifiers associated with N participants in a multi-participant event.
Figure 7B:
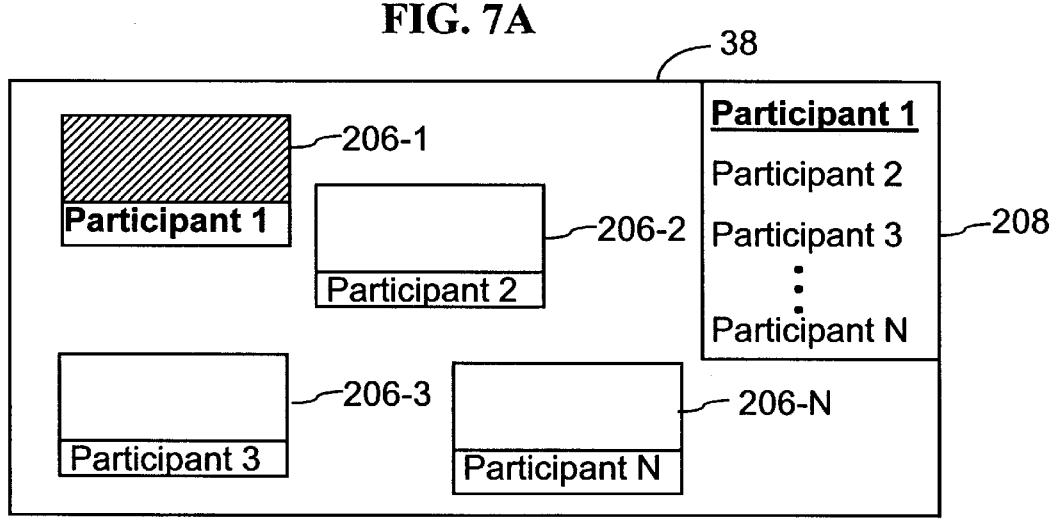
Figure 7C:
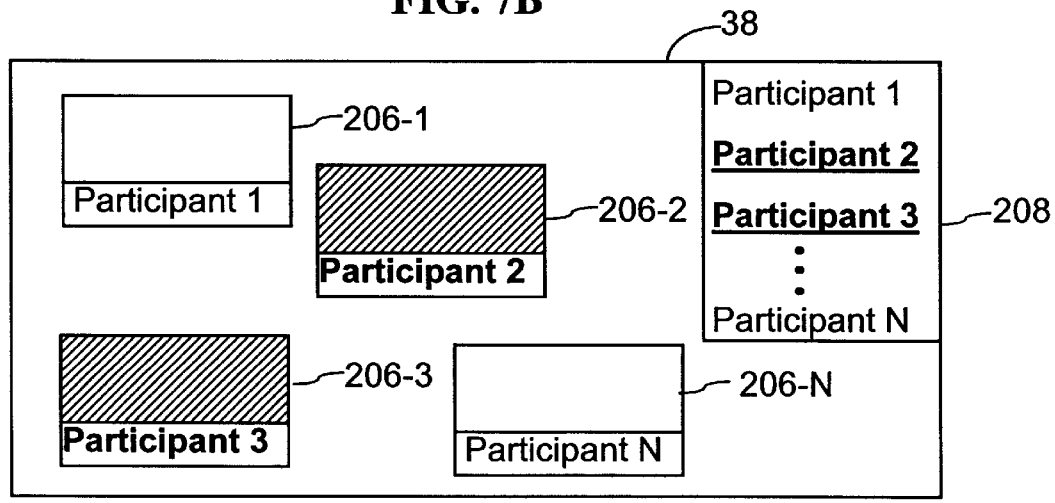

FIG. 7 provides a schematic illustration of the appearance of visual IDs 206 on display 38 after three different cycles of the process illustrated in FIG. 6. In FIG. 7*a,* visual identification module 60 determined that none of the participants in a multi-participant event are currently speaking. In such a case, each channel buffer 52 and overflow buffer 54 is empty. FIG. 7*b* shows the status of display 38 after another cycle of the processing steps shown in FIG. 6. In FIG. 7*b* visual identification module 60 determined that participant 1 is speaking. Accordingly, unlike participants 2 thru N, the visual ID state 212 of participant 1 is set to "1" and the visual ID 206 of the participant is hatched rather than blank. It will be appreciated that any number of alterations of visual ID 206 based upon the value of visual ID state 212 (FIG. 2) may be chosen and that FIG. 7 merely serves to illustrate the concept. FIG. 7*c* shows the status of display 38 after a third cycle of the processing steps of FIG. 4. In FIG. 7*c,* participants 2 and 3 are now speaking and participant 1 has stopped speaking. Accordingly, the visual ID 206 of participants is now hatched while all other participants are unhatched.

It will be appreciated that one of the advantages of the present invention is that each participant in a multi-participant event can visually identify and track exactly who is in the multi-participant event. The visual ID 206 of each participant may be displayed in a unique position of display 38 of client 22 (FIG. 1) as shown on the left section of FIGS. 7*a* thru 7*c*. In addition, the visual ID 206 of each participant may be represented in a list format 208. When visual ID 206 are presented in a list format, such as list format 208, characteristics associated with each of the participants may still be visually communicated. In one embodiment, the participants who are currently speaking are placed at the top of the list. Participants who are not speaking are bumped from the top of the list to lower positions on the list. The longer a participant has not spoken, therefore, the lower the participant will be on the list. Additional characteristics may be communicated using a list format such as list format 208. In one example, visual ID 206 is the name of the participant in a list and a graphic the is descriptive of the privileges associated with a participant which is displayed beside the name of the participant in list 206. In one aspect of this example, when the participant has moderation privileges, a special graphic that indicates that the participant such privileges is displayed next to the name of the participant. When the participant is speaking louder than a base reference state, the color used to display the participants name is red-shifted. One of skill in the art will appreciate that there are many other ways in which characteristics of speaking participants may be communicated using a list format 208. Further, it will be appreciated that list 208 could be used in conjunction with the independent display of each visual ID 206 as shown in the left portions of FIGS. 7*a*–7*c* or as a substitute to such independent display.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications to thereby enable others skilled in the art to best utilize the invention and various embodiments with various modifications as are suited to the particular used contemplated. It is intended that the scope of the invention be defined by the following claims and their equivalents. All references cited are incorporated by reference for all purposes.

We claim:

1. A computer product for use in conjunction with a computer system, the computer program product comprising a computer readable storage medium and a computer program mechanism embedded therein, the computer program mechanism comprising:

(i) a participant data structure comprising a plurality of participant records, each participant record associated with a different participant in a multi-participant event;

(ii) an application module for providing a user interface to said multi-participant event;

(iii) a sound control module for receiving a plurality of packets from a network connection, each said packet associated with a participant in said multi-participant event and including digitized speech from said participant, said sound controller comprising:

a plurality of buffers, each buffer including instructions for managing a subset of said packets;

a packet controller that includes instructions for determining said participant associated with said packet and instructions for routing said packet to a buffer, wherein when said packet is routed to said buffer, said packet is managed by said buffer; and a visual identification module that includes instructions for visually identifying said participant in said multi-participant event and a characteristic associated with said participant; and (iv) a sound mixer that includes instructions for mixing digitized speech from at least one of said buffers to produce a signal that is presented to an output device.

2. The computer product of claim 1 wherein said participant record further includes a participant source identifier, a visual identifier associated with said participant, a position of said visual identifier on an output device, and a visual identifier state.

3. The computer product of claim 2 wherein said visual identification module further includes instructions for updating said visual identifier state in a participant record associated with said participant, wherein:

when said participant is speaking in said multi-participant event, said visual identifier is set to a first state; and when said participant is not speaking in said multi-participant event, said visual identifier is set to a second state.

4. The computer product of claim 3 wherein said application module includes instructions for displaying said visual identifier on an output device based upon said characteristic associated with said participant.

5. The computer product of claim 2 wherein said application module includes instructions for displaying said visual identifier on an output device, wherein:

when said participant associated with said visual identifier is speaking in said multi-participant event said unique visual identifier is displayed in a first state; and when said participant associated with said visual identifier is not speaking in said multi-participant event said visual identifier is displayed in a second state.

6. The computer product of claim 2 wherein:

(i) said participant record further includes a reference speech amplitude associated with said participant; and (ii) said visual identification module further includes:

instructions for determining a buffered speech amplitude based upon a characteristic of digitized speech in at least one packet, associated with said participant, that is managed by a buffer;

instructions for computing a speech amplitude differential based on said buffered speech amplitude and said reference speech amplitude;

instructions for updating said visual identifier associated with said participant based on said speech amplitude differential; and instructions for storing said buffered speech amplitude as said reference speech amplitude in said participant record.

7. The computer product of claim 6 wherein said application module includes instructions for displaying said visual identifier on an output device based on a function of said visual identifier state in said participant record; and said instructions for updating said visual identifier associated with said participant based on said speech amplitude differential includes instructions for updating said visual identifier state based upon a value of said speech amplitude differential.

8. The computer product of claim 1 wherein said multi-participant event is selected from the group consisting of an audio conference and an on-line game.

9. The computer product of claim 1 wherein:

said plurality of buffers includes an overflow buffer and a plurality of channel buffers, wherein:

(i) when a packet is present in a channel buffer, said channel buffer is characterized by an identity of said packet; and (ii) when no packet is present in a channel buffer said channel buffer is available; and said instructions for routing said packet to said buffer includes instructions for comparing an identity of the participant associated with said packet with said identity that characterizes said channel buffer, wherein:

(a) when said identity of the participant associated with said packet matches said identity characterizing said channel buffer, said packet is routed to said channel buffer; and (b) when said identity of the participant associated with said packet does not match said identity that characterizes a channel buffer, said packet is routed to an available channel buffer, and when no channel buffer in said plurality of channel buffers is available, said packet is routed to said overflow buffer.

10. The computer product of claim 1 wherein said instructions for managing said subset of said packets is first in first out.

11. The computer product of claim 2 wherein said participant source identifier is a temporary unique number assigned to said participant for the duration of said multi-participant event.

12. The computer product of claim 2 wherein said packet comprises a packet header and a formatted payload and said formatted payload includes said participant source identifier, a packet data size, and said digitized speech from said participant.

13. The computer product of claim 9 wherein said sound mixer further includes:

instructions for retrieving a portion of said digitized speech from a first packet in each said channel buffer; and instructions for combining each said portion of said digitized speech into said mixed digitized signal.

14. The computer product of claim 13 wherein said portion of said digitized speech is ten milliseconds.

15. The computer product of claim 1 wherein said characteristic associated with said participant is selected from the group consisting of (i) whether said participant is associated with a channel buffer, (ii) whether said participant has moderation privileges, (iii) whether said participant has placed said multi-participant event on hold and (iv) whether said participant has specified that he is away from the keyboard.

16. A method for visually identifying speaking participants in a multi-participant event, said method comprising the steps of:

receiving a packet from a remote source;

determining an identity associated with said packet;

comparing said identity of said packet with an identity associated with a channel buffer selected from a plurality of channel buffers; wherein, said identity associated with said channel buffer is determined by an identity of a packet stored by said channel buffer when said channel buffer is storing a packet, and said channel buffer is available when no packet is stored by said channel buffer;

routing said packet to:

(i) a channel buffer when said identity of said packet matches said identity associated with said channel buffer;

(ii) an available channel buffer when said identity of said packet does not match an identity of a channel buffer; and (iii) an overflow buffer when said identity of said packet does not match an identity of a channel buffer and there is no available channel buffer; and associating a different visual identifier with each participant in said multi-participant event;

displaying each said different visual identifier on an output device; wherein said different visual identifier is determined by a characteristic associated with said participant.

17. The method of claim 16 further comprising the step of:

updating a visual identifier state in a participant record, said visual identifier state determined by whether an identity of a participant corresponding to said participant record matches an identity associated with a channel buffer.

18. The method of claim 17 wherein said updating step further comprises:

determining a difference between a characteristic of said packet and a reference characteristic stored in said participant record; and setting said visual identifier state based upon said difference.

19. The method of claim 16 wherein said multi-participant event includes a local participant and at least one remote participant, said method further comprising the steps of:

accepting a frame of sound from an input device;

deriving acoustic parameters from the content of said frame of sound;

performing an acoustic function using said acoustic parameters to determine whether said frame of sound includes speech from said local participant;

updating a visual identifier state in a participant record associated with said local participant, said visual identifier state determined by whether said frame of sound includes speech from said local participant.

20. The method of claim 16 wherein said multi-participant event is selected from the group consisting of an audio conference and an on-line game.

21. The method of claim 16 further including the step of assigning a temporary number to a participant for the duration of said multi-participant event; wherein said temporary number provides an identity to said participant.

22. The method of claim 16 further including the steps of:

mixing sound from each channel buffer; and presenting said mixed sound to an output device.

23. The method of claim 22 wherein said mixing step further includes the steps of:

retrieving a portion of digitized speech from a first packet in each said channel buffer; and combining each said portion of said digitized speech into a mixed digitized signal.

24. The method of claim 23 wherein said portion of said digitized speech is ten milliseconds.

25. The method of claim 16 wherein said characteristic associated with said participant is selected from the group consisting of (i) whether said participant is associated with a channel buffer, (ii) whether said participant has moderation privileges, (iii) whether said participant has placed said multi-participant event on hold and (iv) whether said participant has specified that he is away from the keyboard.

* * * * *